United States Patent
Agarwalla et al.

(10) Patent No.: US 8,412,791 B2
(45) Date of Patent: Apr. 2, 2013

(54) APPARATUS AND METHOD FOR OFFLOADING APPLICATION COMPONENTS TO EDGE SERVERS

(75) Inventors: Rajesh S. Agarwalla, Pittsburgh, PA (US); Khalil S. Amiri, Thornwood, NY (US); Madhu Chetuparambil, Pittsburgh, PA (US); James R. Giles, Yorktown Heights, NY (US); Manu M. Gugnani, Pittsburgh, PA (US); Shih-pai Lee, Pittsburgh, PA (US); Subbarao Meduri, Pittsburgh, PA (US); Mahesh Patil, Pittsburgh, PA (US); Dinesh Verma, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 3227 days.

(21) Appl. No.: 09/969,294

(22) Filed: Sep. 28, 2001

(65) Prior Publication Data

US 2003/0084091 A1 May 1, 2003

(51) Int. Cl.
*G06F 15/16* (2006.01)
*G06F 15/173* (2006.01)
(52) U.S. Cl. ......... 709/217; 709/223; 709/201; 709/203
(58) Field of Classification Search .................. 709/217, 709/203, 201, 223, 219, 230, 228
See application file for complete search history.

(56) References Cited

U.S. PATENT DOCUMENTS

| | | | | |
|---|---|---|---|---|
| 6,108,703 A * | 8/2000 | Leighton et al. | ............... | 709/219 |
| 6,446,109 B2 * | 9/2002 | Gupta | ........................... | 709/203 |
| 6,813,641 B2 * | 11/2004 | Fomenko et al. | ............. | 709/230 |
| 6,868,448 B1 * | 3/2005 | Gupta et al. | ................... | 709/226 |
| 6,871,213 B1 * | 3/2005 | Graham et al. | ................ | 709/219 |
| 6,976,090 B2 * | 12/2005 | Ben-Shaul et al. | ........... | 709/246 |
| 2002/0065938 A1 * | 5/2002 | Jungck et al. | .................. | 709/246 |
| 2002/0078174 A1 * | 6/2002 | Sim et al. | ....................... | 709/219 |
| 2003/0055875 A1 * | 3/2003 | Carter | ........................... | 709/203 |

* cited by examiner

*Primary Examiner* — Gregory Todd
(74) *Attorney, Agent, or Firm* — Cuenot, Forsythe & Kim, LLC

(57) ABSTRACT

An apparatus and method for off-loading application components to edge servers are provided. An application is made edge-aware by defining which components of the application may be run from an edge server, and which components cannot be run from an edge server. When a request is received that is to be processed by an application on an origin server, a determination is made as to whether the application contains edgable components. If so, an edgified version of the application is created. When a request is received that is handled by a component that may be run on the edge server, the request is handled by that component on the edge server. When a request is received that is handled by a component that is not edgable, the request is passed to a proxy agent which then provides the request to a broker agent on the origin server.

12 Claims, 4 Drawing Sheets

APPARATUS AND METHOD FOR OFFLOADING APPLICATION COMPONENTS TO EDGE SERVERS

RELATED APPLICATIONS

This application is related to commonly assigned and co-pending U.S. patent application Ser. No. 09/960,451 entitled 'Method and Apparatus for Minimizing Inconsistency Between Data Sources in a Web Content Distribution System', filed on Sep. 21, 2001 and U.S. patent application Ser. No. 09/960,448 entitled 'Method and Apparatus for Caching Subscribed and Non-Subscribed Content in a Network Data Processing System', filed on Sep. 21, 2001, and U.S. patent application Ser. No. 09/966,229 entitled 'Addressing the Name Space Mismatch Between Content Servers and Content Caching Systems', filed on Sep. 27, 2001, all of which are hereby incorporated by reference.

BACKGROUND OF THE INVENTION

1. Technical Field

The present invention is directed to an apparatus and method for offloading application components to edge servers. More specifically, the present invention is directed to an apparatus and method for identifying application components that may be run from an edge server and transferring these components to an edge server when a request is received from a client device.

2. Description of Related Art

Proxy servers, also referred to as "proxies," are generally known in the art. A proxy server is a server or an application that breaks the connection between a client and a server and performs some operations on behalf of the original server. Proxy servers are available for common Internet services. For example, an HTTP proxy is used for Web access and an SMTP proxy is used for e-mail. As an example, a proxy server may perform the operation of network address translation (NAT), which presents one organization-wide IP address to the Internet. The network address translation funnels all user requests to the Internet and fans responses back out to the appropriate users.

Proxies are generally located closer, in terms of network topology, to client devices than content servers. Because proxies are closer to the client devices, proxies have been used to cache Web pages, so that the next request can be obtained locally. By caching Web pages locally, a performance enhancement is obtained since the performance is not degraded by bandwidth and content, or origin, server performance limitations.

The current state of the art limits the use of proxy caching, however, to static or infrequently changing content, such as the Web pages previously mentioned. There is very limited ability to cache dynamically changing content on a proxy. While there is some support for running components of an application at another machine in the current art, e.g. Java applets or active networking, using these techniques requires a fundamental change in the way applications are written and programmed.

In the current state of the art, the development of application components is done by using the software packages provided in accordance with a distributed execution programming model. Programs written to run on web-servers, for example, are written to be compliant with the Java programming model, and can be composed as Java Servlets or as Java Server Pages (JSPs). Since most applications are developed with the assumption that they will run on a single server, there is not much support provided for distributing them. Server software that allows the execution of servlets and JSPs are commonly called web application servers.

As a result, the current state of the art can not support running components of an application written to traditional programming models at a proxy server. Therefore, it would be beneficial to have an apparatus and method for automatically identifying components of an application, written using the traditional programming model, that may be run by an edge server, or proxy, and executing those components on the edge server.

SUMMARY OF THE INVENTION

The present invention provides an apparatus and method for off-loading application components to edge servers. With the apparatus and method of the present invention, an application is made edge-aware by defining which components of the application may be run from an edge server, i.e. edgable, and which components cannot be run from an edge server, i.e. non-edgable.

When a request is received that is to be processed by an application on an origin server, a determination is made as to whether the application contains edgable components. If so, an edgified version of the application is created on the edge server. The edgified version, i.e. edge application, includes the components that may be run on the edge server and proxy agents for components that cannot be run on the edge server.

When a request is received that is handled by a component that may be run on the edge server, the request is handled by that component on the edge server. When a request is received that is handled by a component that is not edgable, the request is passed to a proxy agent which then provides the request to a broker agent on the origin server. The broker agent then replicates the request and forwards it to an appropriate component of the origin server application. In this way, the performance of the application may be improved by off-loading processing performed by edgable components to an edge server which is closer to the client device than the origin server. Other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
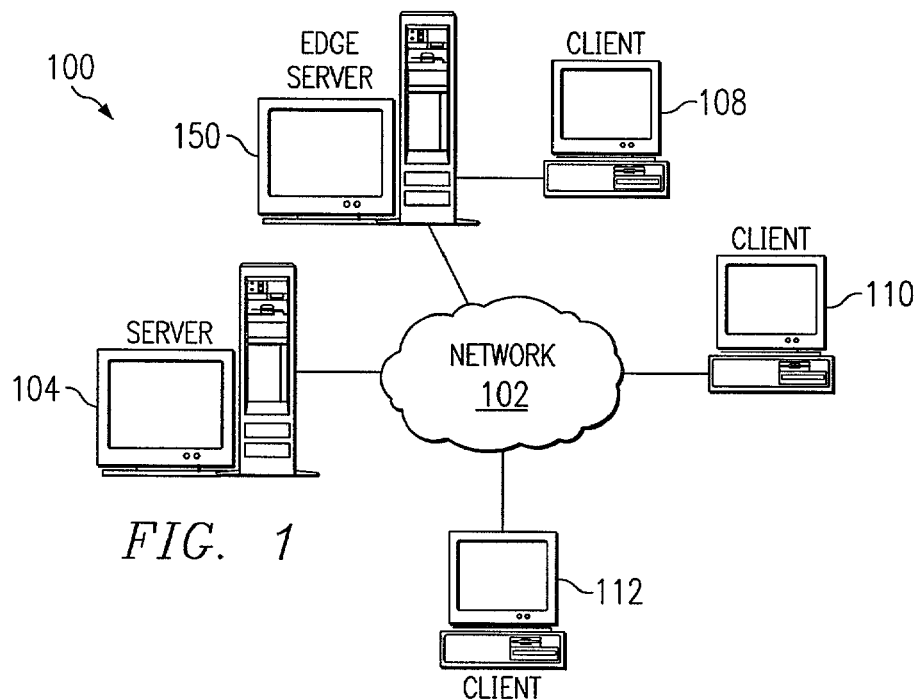
FIG. 1 is an exemplary diagram illustrating a distributed data processing system in accordance with the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102. The server 104 may be a reservation server that is capable of making reservations in accordance with the present invention, as described in greater detail hereafter.

In addition, clients 108, 110, and 112 are connected to network 102. These clients 108, 110, and 112 may be, for example, personal computers, personal digital assistants, (PDAs), cellular telephones, wireless two-way pagers, network computers, or any other computing device capable of communication via the network 102. In a preferred embodiment, these client devices 108, 110 and 112 are modified to include software instructions for implementing client side operations of the present invention, as described hereafter. However, the present invention is not limited to such an embodiment and all of the operations of the present invention may be implemented in server 104 without departing from the spirit and scope of the present invention.

In the depicted example, server 104 provides data, such as web-pages, boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

In addition to the above, an edge server 150 is provided. The edge server 150 acts as a server to which edgable application components may be off-loaded when a request for access to the application is received from a client device, such as client device 108. The edge server 150 operates such that edgable application components are executed by the edge server 150 and non-edgable components are proxied by the edge server 150 such that requests to non-edgable application components are forwarded to the origin server, such as server 104. The manner by which application components are identified as edgable and the manner by which the edge server 150 operates on edgable and non-edgable application components will be described in greater detail hereafter.

While the edge server 150 is shown in FIG. 1 as being between the network 102 and the client 108, the positioning of the edge server 150 is not limited by FIG. 1. Rather, the edge server 150 is preferably positioned at an enterprise or network edge to effect scalability and better performance characteristics by virtue of being closer to the client device 108. While FIG. 1 shows one instance of an edge-server, it is expected that a system in accordance with this invention can have more than one edge-server, with each edge-server providing service to a set of clients.

Figure 2:
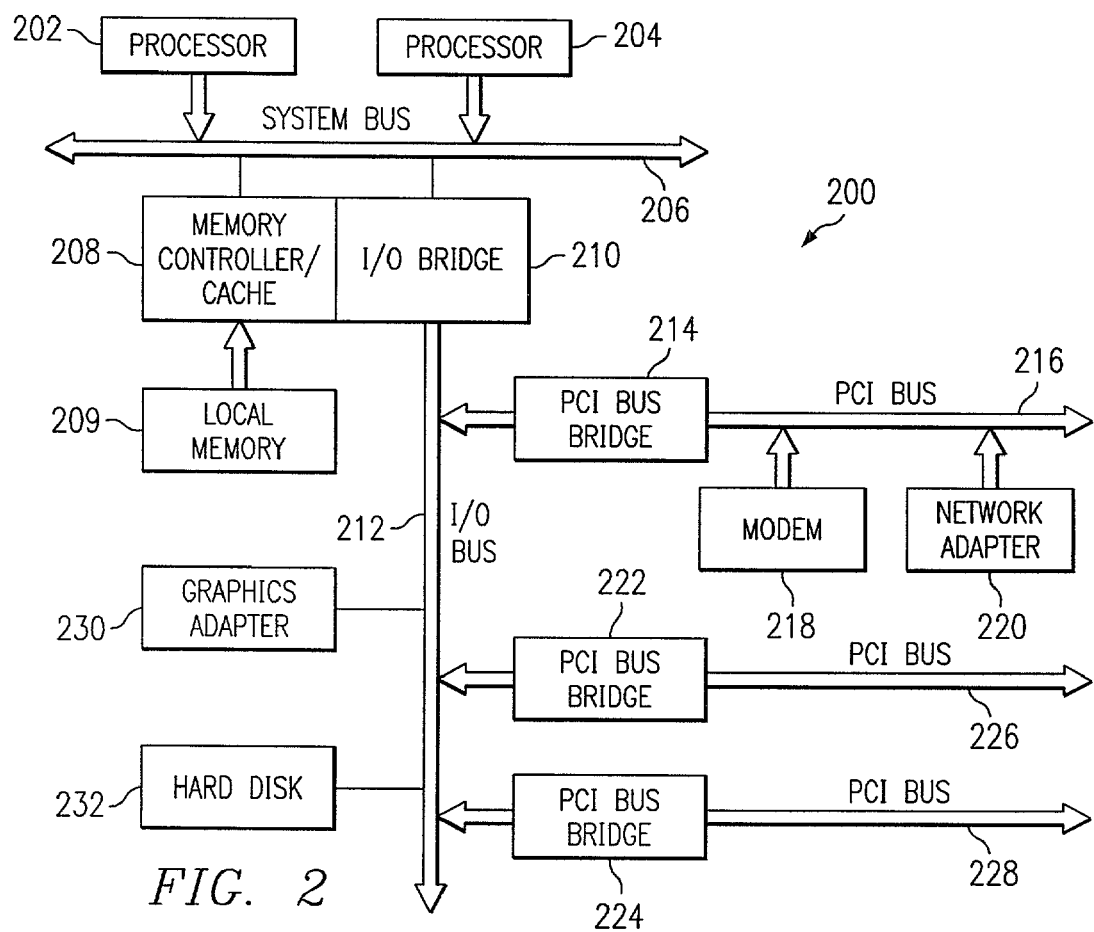
FIG. 2 is an exemplary diagram illustrating a server data processing device.

Referring to FIG. 2, a block diagram of a data processing system that may be implemented as a server, such as server 104 or edge server 150 in FIG. 1, is depicted. Such systems are known in the current state of the art, and provide a platform for the preferred embodiment of the present invention. As shown in FIG. 2, data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
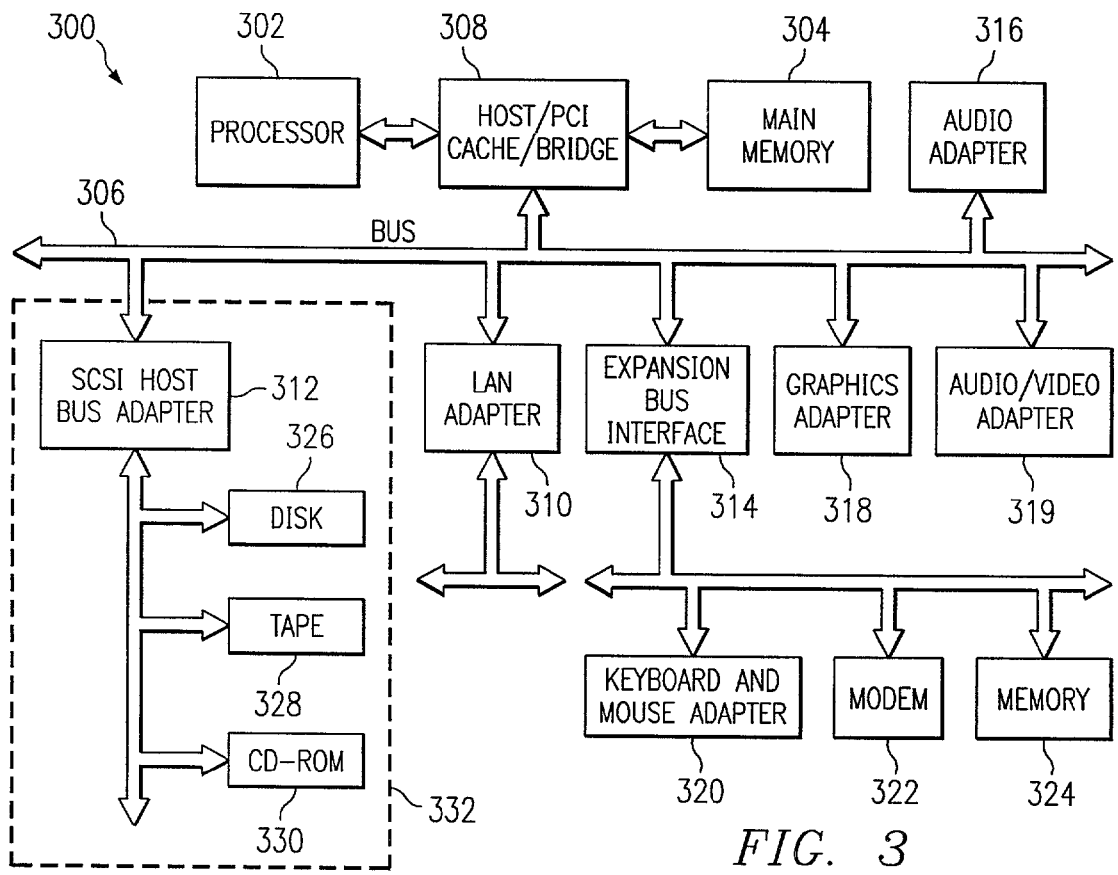
FIG. 3 is an exemplary diagram illustrating a client data processing device.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

In the preferred embodiment of the invention, the data processing system 300 include the software for a web-browser, or other client program that can interact with the server 104 and/or edgeserver 150 shown in FIG. 1 and obtain data to be processed at the data processing system. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data. The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4A:
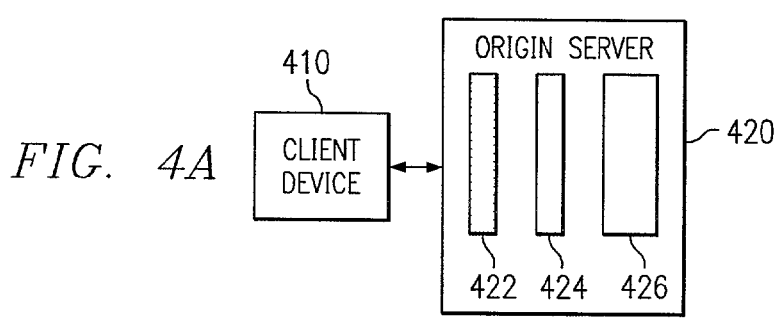
FIG. 4A is an exemplary diagram illustrating the prior art mechanism for obtaining access to server applications on a remote server.

As noted above, the present invention provides an edge server to which edgable components may be off-loaded from origin servers for execution on the edge server. The overall concept of the present invention is to run an edgified version, i.e. an application having edgable and non-edgable components, of an origin server application on an edge server. Edgable components are components that can execute on an edge server. Non-edgable components are the components of an application that, due to various edge limitations, are incapable of execution on the edge, or that have been identified as components that should not be executed at the edge for reasons such as performance. In prior art systems, as shown in FIG. 4A, the software running at the server is organized in a tiered fashion. Software is commonly divided into three tiers, i.e. a presentation tier 422, a business logic tier 424, and a data store tier 426, of an application co-located at the origin server 420. Each of the tiers may be implemented as different software components in the same server machine, or may be implemented with each tier running on a separate server machine. In some instances, software corresponding to a tier may run on multiple server machines. Regardless of the allocation of the tiers to the machines, in such a system, the client is forced to contact the origin server 420 to obtain access to the application.

As previously noted, having all client devices contact the origin server for access to the application places performance limits on the origin server 420. The present invention obtains performance improvements by moving some of the presentation and business logic related processing to an edge server.

Figure 4B:
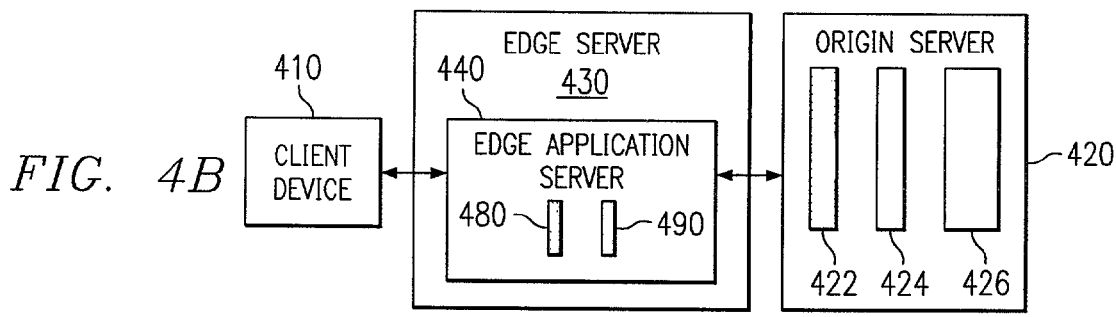
FIG. 4B is an exemplary diagram illustrating a mechanism of the present invention for obtaining access to edgable application components according to the present invention.

FIG. 4B illustrates a system configuration according to the present invention. As shown in FIG. 4B, an edge server 430 is provided between the client device 410 and the origin server 420. The edge server 430 receives a request for an application from the client device 410. On the receipt of the first such request, The edge server 430 then sends a request to the origin server 420 for the application to be off-loaded to the edge server 430. In subsequent requests, the offloaded application is already present at the edge-server and this step may be omitted.

In response to receiving the request for off-loading the application to the edge server 430, the origin server 420 determines if the application is an edge-aware application. An edge-aware application is an application at the origin server 420 that is enhanced with edgable components that allow for secure distribution of the edgable components to edge servers and provides a level of transparency between edgable and non-edgable application execution. As shown in FIG. 4B, these edgable components are portions 480-490 of the presentation and/or business logic processing tiers 422-424 of the application. However, the concept of offloading applications is not restricted to the software in these tiers. Those of ordinary skill in the art should realize that similar offloading can be provided for software components in other tiers as well.

In the current state of the art, the development of application components is done by using the software packages provided in accordance with a distributed execution programming model. Programs written to run on web-servers, for example, are written to be compliant with the Java programming model, and can be composed as Java Servlets or as Java Server Pages (JSPs). Since most applications are developed with the assumption that they will run on a single server, there is not much support provided for distributing them.

One of the key advantages of the approach defined in the present invention is that it allows a programmer to adhere to the well-known programming model, i.e. Execution on a single computing device, and write JSPs, servlets, etc., as they would write for a traditional centralized execution. However, the operations described subsequently enable the system to determine the edgable components of an application designed initially to be executed on a single computing device or origin server, and to execute them on the edge-server instead of the origin server.

If the application is an edge-aware application, an edgified version of the application, i.e. an edge application 440, is created on the edge server 430. To create an edge application 440, the edge server 430, the origin server 420, or another computer used to prepare applications for offload, depending on the particular embodiment, classifies components of the application into edgable and non-edgable components. This classification may be based on information obtained from a configuration file, a deployment descriptor, or the like.

The edge server 430 or origin server 420 then replaces non-edgable components by proxy agents. A proxy agent is a special edgable servlet that relays client requests to non-edgable components on the origin server 420. Thereafter, when requests are received from the client device 410, the requests are provided to the edge application. If the request is to be processed by an edgable component of the application, the request is processed at the edge server 430 by the edgable component. If the request is to be processed by a non-edgable component, the proxy agent in the edge application routes the request to the origin server 420 which then processes the request using the origin server 420 version of the application component.

Figure 5:
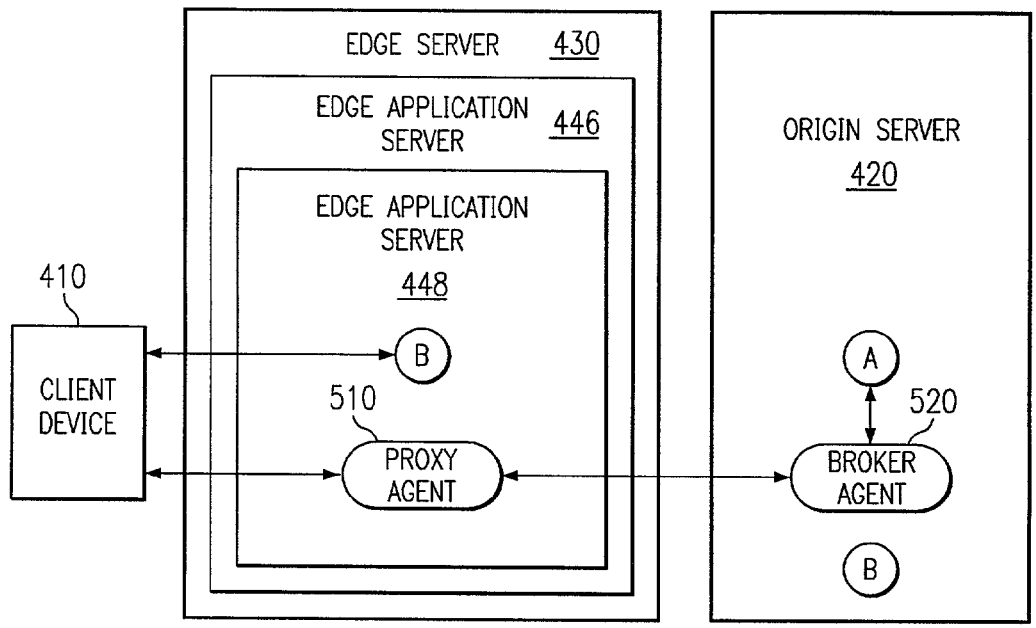
FIG. 5 is an exemplary diagram illustrating an operation of the present invention for accessing edgable and non-edgable application components according to the present invention.

FIG. 5 illustrates an exemplary operation of the present invention. As shown in FIG. 5, the edge server 430 includes an application router 446 and an edge application engine 448. The application router 446 transparently dispatches requests for edgable components of an application that the edge server 430 is off-loading to the local edge application engine 448 and proxies non-edgable components to the origin server 420. As previously noted, the edge server 430 includes an edge application that contains edgable components and proxy agents for non-edgable components. The application router 446 operates based on these egable components and the proxy agents to route requests either to the local edgable components or to the origin server 420.

The edge application engine 448 operates to execute the edge application 448 and interface with the application router 446 of the edge server 430. The edge application engine 448 provides an infrastructure for executing edgable application components on the edge server 430 and relaying the requests for non-edgable requests to the origin server 420.

As shown in FIG. 5, all requests from the client device 410 for servlet B, an edgable component, are serviced by the edgable component B in the edge application engine 448. All requests for servlet A, a non-edgable component, are relayed by the proxy agent 510 to a broker agent 520 on the origin server 420. The broker agent 520, in turn, dispatches the request to an appropriate component, i.e. servlet A, in the edge-aware application on the origin server 420.

A protocol exists between the proxy agent 510 and the broker agent 520 that enables dispatching requests and context information from an edge application on the edge server to non-edgable components in an edge-aware application on the origin server. In a preferred embodiment, the protocol on an origin server side causes the broker agent to invoke the target component, i.e. the non-edgable component, with HttpServletRequest and HttpServletResponse objects that are consistent in state with the request/response objects that the proxy agent 510 was invoked with. On the edge side, the protocol in the proxy agent 510 sets the state of the request/response objects to those of the state that the target of broker agent 520 returned with.

The proxy agent 510 implements the edge side of the protocol. On a request path, the proxy agent 510 captures the state of HttpServletRequest and HttpServletResponse objects (which would include attribute values) and piggybacks the state information on the Universal Resource Locator (URL) relay request to the broker agent 520. On the response path, the proxy agent 510 extracts the origin server's HttpServlet-Response and HttpServletRequest related states (piggy-backed by the broker agent) and sets its own request/response with those values.

The broker agent 520 implements the origin server side of the protocol. On the request path, the broker agent 520 extracts the edge server HttpServletRequest and HttpServletResponse object states from the URL request and creates a copy of the request before dispatching the request. On a return path, the broker agent piggybacks the HttpServletResponse and HttpServletRequest related states on the URL response to the edge server. The protocol also allows for propagation of exceptions that are raised in an edge-aware application to the off-loaded edge application. As previously mentioned, the present invention operates on edge-aware applications such that edgable components of the edge-aware applications are executed by the edge server and non-edgable components are executed by the origin server. To create an edge-aware application, the first step is to classify the origin application components into edgable and non-edgable components. The classification may be performed by a developer of the edge-aware application or may be performed in an automated manner. For example, a developer may specify a configuration file describing distributability of the application components. Alternatively, the developer may use a set of programming Application Program Interfaces (APIs) that automatically generate the configuration file. The following guidelines are used to determine if a component is edgable or not:

1) Edgable components should not access resources not available at the edge server. For example, a servlet/Java Server Page (JSP) accessing a data base at the origin server would not be able to be executed at the edge server.
2) Edgable components should not share servlet context attributes with a non-edgable component. For example, a servlet that sets a context attribute to be used by a non-edgable servlet would be deemed non-edgable.
3) Edgable components should not have any security constraints.
4) Edgable components should not degrade the application performance when executed on the edge server. For example, a component that invokes multiple requests to non-edgable components would increase the bandwidth. Therefore, it would be better to co-locate this component with the non-edgable components at the origin server.

Once the components of the application are classified as edgable/non-edgable, a conversion tool is used that takes the deployment information, e.g., from the configuration file, and generates two deployment descriptors—one for the edge server and one for the origin server. The deployment descriptor for the edge server includes all components that can run at the edge server as well as a proxy agent for components that cannot run at the edge server. The deployment descriptor for the origin server includes all of the components of the application as well as a broker agent component that is used to process requests from the edge server.

In a preferred embodiment, the deployment descriptors are Extended Markup Language deployment descriptors. For example, the edge deployment descriptor may be stored as an edge.xml deployment descriptor having a document type definition as follows:

```
<!ELEMENT edge-app (display-name?, description?,
    default-type, edgable*, non-edgable*)>
    <!ELEMENT display-name (#PCDATA)>
    <!ELEMENT description (#PCDATA)>
    <!- - default-type can be "edgable" or "non-edgable".
```

-continued

```
Servlets and JSPs for which the edgable property is not
specifically defined would have this property -->
    <!ELEMENT default-type (#PCDATA)>
    <!-- all the edgable servlets are defined by this
element>
    <!ELEMENT edgable (servlet-name*)>
    <!-- all the non-edgable servlets are defined by this
element>
    <!ELEMENT non-edgable (servlet-name*)>
    <!-- servlet-name is defined in the associated web-xml
-->
    <!ELEMENT servlet-name (#PCDATA)>
```

An example of an edge.xml is as follows:

```
<!DOCTYPE edge-app PUBLIC>
<edge-app>
    <display-name> example-edge </display-name>
    <description> this is a edge modle for example app
</description>
    <default-type> edgable </default-type>
    <non-edgable>
    <servlet-name> example-non-edgable </servlet-name>
    <servlet-name> another-non-edgable </servlet-name>
    </non-edgable>
</edge -app>
```

As an example of how the present invention may be implemented in an automated manner, a public interface may be defined that identifies application components as either edgable or not edgable. That is, a public interface may be provided which can be inherited by application components to mark their edgability. For example, a public interface Edgable.java may be defined as follows:
Package com.ibm.edgeserver;
public interface Edgable{ }
A programmer can define any Java class as edgable by declaring that it implements this public interface. An API or set of APIs may then be provided that search the contents of a Java Archive (JAR) or Web Archive (WAR) file and generate the edge.xml files by determining which classes are going to be implementing the egable interface.

The advantage of an edgable interface, such as that shown above, and an associated API is that the edgability may be applied to any Java construct and the programmer can choose the level at which the edgability definition needs to be provided. Many new development environments and tools are moving towards a goal where the underlying servlets, JSPs and Enterprise Java Beans (EJBs) are hidden from the programmer, and other Java constructs are offered which result in the generation of the servlets, JSPs, etc. The use of an edgable interface allows the programmer to mark the higher level constructs. A tool can then determine the servlets/JSPs that are associated with a construct and mark the right ones as being egable or not.

As previously stated, the edgification process effectively involves replacing non-edgable components with edgable components. An edgified version of an application, i.e. an edge application, presents an illusion to the client device that all of it's components are edgable. This illusion is created by changing URL to servlet implementation class mappings in the deployment descriptor. All the original mappings from URL to non-edgable components are changed to URL to proxy agent components. All non-edgable components are hidden by these mapping changes. For every request, the edge application server extracts the request's URL, maps the URL to a servlet class, and dispatches the request to an instance of that class.

The edge application server uses two elements of the deployment descriptor to map a URL to it's servlet class, <servlet-mapping> and <servlet>. The URL is mapped to ServletName by <servlet-mapping> element values. The ServletName is mapped to a servlet class by <servlet> element values.

Thus, redirecting requests originally meant for non-edgable components to proxy agents really involves modifications of <servlet> and <servlet-mapping> elements. For edgable components, ServletName-ServletClass/JSP mapping on the edge server is kept the same as on the origin server. This ensures that the request for ServletName gets executed on the edge server. Non-edgable components have their <servlet> element changed so their servlet-class becomes the proxy agent class. In a preferred embodiment, a URL for the original servlet is added as an initial parameter for the proxy servlet by adding an <init-param> entry to the <servlet> element so that the proxy agent can inform the broker agent of the appropriate servlet to call on the origin server. In this way, all requests for non-edgable components get redirected to the proxy agent.

Having generated an edge application, the present invention makes use of the edge application in the manner previously described. Specifically, if a request is received by the edge server for the edge application, the edge application server extracts the URL and performs the mapping indicated in the deployment descriptor. This mapping will either map the request to an edgable component which handles the request at the edge server, or the mapping will map the request to a proxy agent. If the mapping maps the request to a proxy agent, the proxy agent, using the protocol previously discussed, sends the request to the broker agent on the origin server which replicates and forwards the request to a non-edgable component in the origin server application for processing.

Thus, the present invention provides a mechanism by which components of an application may be off-loaded to edge servers. The present invention allows some components of an application to execute on an edge server while other components execute on the origin server. From the viewpoint of the client device, however, all of the components appear to be executing on the edge server. In this way, the performance benefits of executing applications on servers closer to the client device are obtained.

Figure 6:
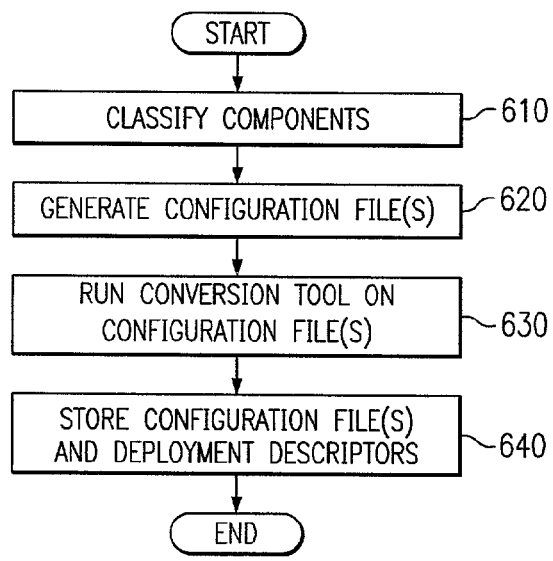
FIG. 6 is a flowchart outlining an operation of the present invention for creating an edge-aware application.

FIG. 6 is a flowchart outlining an operation of the present invention for creating an edge-aware application. As shown in FIG. 6, the operation starts with classifying components of the application into edgable components and non-edgable components (step 610). Generate configuration file(s) based on the classifications (step 620). A programmer may choose to create such a configuration file directly, thereby omitting the steps of 610 and 620. Run conversion tool on the configuration file(s) to generate deployment descriptors (step 630). Store configuration file(s) and deployment descriptors in association with the application (step 640). The storage step may involve copying the configuration files and deployment description to the edge-server. The operation then ends.

Figure 7:
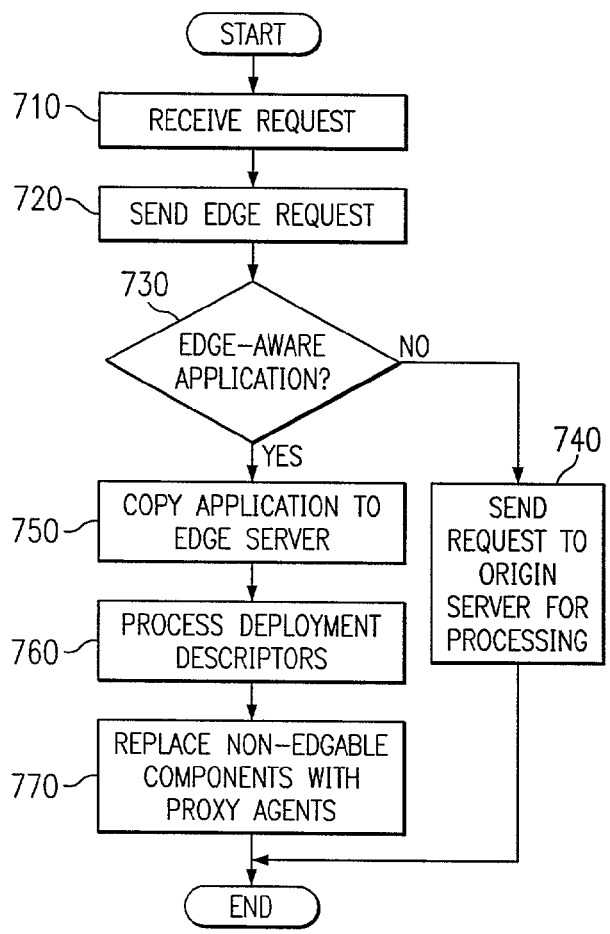
FIG. 7 is a flowchart outlining an operation of the present invention for creating an edge application from an edge-aware application.

FIG. 7 is a flowchart outlining an operation of the present invention for creating an edge application from an edge-aware application. As shown in FIG. 7, the operation starts with receiving an application request that is to be processed by an application on an origin server (step 710). An edge request is sent to the origin server requesting that the application be off-loaded to the edge server (step 720). A determination is made as to whether the application is an edge-aware application (step 730). If not, the application request is sent to the origin server for processing (step 740) and the operation ends.

If the application is an edge-aware application, an edgified version of the application is generated on the edge server by first copying the application and deployment descriptors to the edge server (step 750). If the edgified version is already present, this step may be omitted. Then, the deployment descriptors are then processed to identify components that are edgable and components that are non-edgable (step 760). Components that are non-edgable are then replaced by proxy agents (step 770) and the operation ends.

Figure 8:
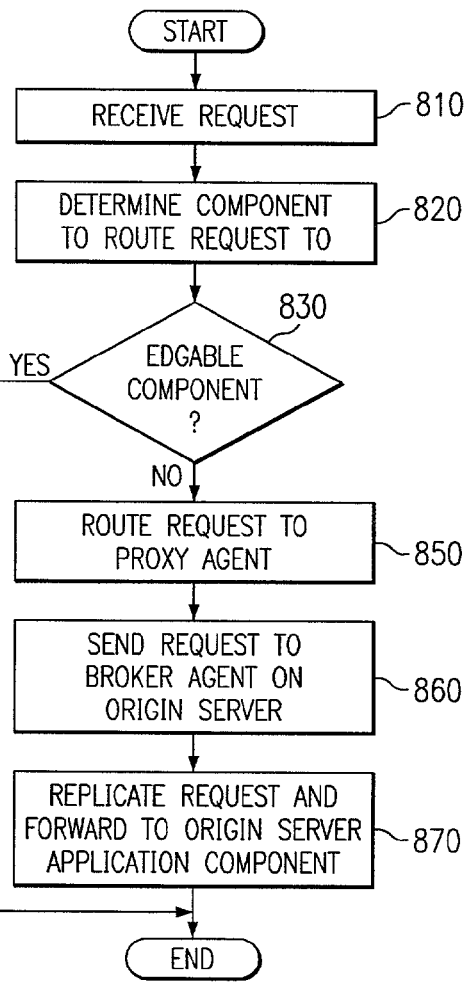
FIG. 8 is a flowchart outlining an operation of the present invention when handling a request to an edge application.

FIG. 8 is a flowchart outlining an operation of the present invention when handling a request to an edge application. As shown in FIG. 8, the operation starts with receiving a request directed to an origin application (step 810). The request is received by an edge application server on the edge server which determines which component of the application to route the request to (step 820). A determination is made as to whether the request is routed to an edgable component or not (step 830).

If the request is routed to an edgable component, the request is processed on the edge server by the edgable component (step 840). If the request is routed to a non-edgable component, the request is actually routed to a proxy agent (step 850) which then sends the request to a broker agent on the origin server (step 860). The broker agent then replicates the request and forwards it to the origin server application for processing by the appropriate component (step 870). The operation then ends.

Thus, the present invention allows application components to be designated as either edgable or non-edgable and have these components executed either on an edge server or the origin server based on their designation. In this way, the performance of the application is increased by obtaining the benefit of execution of edgable components on an edge server that is closer to the client device.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of executing an application in a distributed data processing system, comprising:

receiving a request directed to an application on an origin server, wherein the application is an application written for execution on a single computing device;

identifying whether the application includes one or more components that may be executed by an edge server; and creating an edge version of the application on the edge server if the application includes one or more components that may be executed by the edge server;

wherein creating an edge version of the application includes classifying components of the application into edgable and non-edgable components.

2. The method of claim 1, wherein creating an edge version of the application further includes replacing non-edgable components of the application with proxy agents.

3. The method of claim 2, wherein the proxy agents redirect requests that are to be processed by non-edgable components of the edge application to corresponding non-edgable components of the application on the origin server.

4. The method of claim 1, wherein requests to be processed by edgable components are handled by components of the edge version of the application and requests to be processed by non-edgable components are forwarded to the origin server.

5. The method of claim 4, wherein the requests to be processed by non-edgable components are sent to a broker agent on the origin server, and wherein the broker agent operates to invoke the non-edgable components of the application to operate on the requests.

6. The method of claim 5, wherein the broker agent invokes the non-edgable components using objects that are consistent in state with the requests.

7. An apparatus for executing an application in a distributed data processing system, comprising:

means for receiving a request directed to an application on an origin server, wherein the application is an application written for execution on a single computing device;

means for identifying whether the application includes one or more components that may be executed by an edge server; and means for creating an edge version of the application on the edge server if the application includes one or more components that may be executed by the edge server;

wherein the means for creating an edge version of the application includes means for classifying components of the application into edgable and non-edgable components.

8. The apparatus of claim 7, wherein the means for creating an edge version of the application further includes means for replacing non-edgable components of the application with proxy agents.

9. The apparatus of claim 8, wherein the proxy agents redirect requests that are to be processed by non-edgable components of the edge application to corresponding non-edgable components of the application on the origin server.

10. The apparatus of claim 7, wherein requests to be processed by edgable components are handled by components of the edge version of the application and requests to be processed by non-edgable components are forwarded to the origin server.

11. The apparatus of claim 10, wherein the requests to be processed by non-edgable components are sent to a broker agent on the origin server, and wherein the broker agent operates to invoke the non-edgable components of the application to operate on the requests.

12. The apparatus of claim 11, wherein the broker agent invokes the non-edgable components using objects that are consistent in state with the requests.

* * * * *